United States Patent
Kawamura et al.

(10) Patent No.: US 12,449,607 B2
(45) Date of Patent: Oct. 21, 2025

(54) OPTICAL MODULE

(71) Applicant: Nippon Telegraph and Telephone Corporation, Tokyo (JP)

(72) Inventors: Yuriko Kawamura, Musashino (JP); Takashi Yamada, Musashino (JP); Yusuke Nasu, Musashino (JP)

(73) Assignee: NTT, INC., Tokyo (JP)

( * ) Notice: Subject to any disclaimer, the term of this patent is extended or adjusted under 35 U.S.C. 154(b) by 0 days.

(21) Appl. No.: 18/760,550

(22) Filed: Jul. 1, 2024

(65) Prior Publication Data

US 2024/0353627 A1 Oct. 24, 2024

Related U.S. Application Data

(63) Continuation of application No. 17/619,124, filed as application No. PCT/JP2019/026133 on Jul. 1, 2019, now Pat. No. 12,055,765.

(51) Int. Cl.
| | |
|---|---|
| *G02B 6/36* | (2006.01) |
| *G02B 6/26* | (2006.01) |
| *G02B 6/42* | (2006.01) |

(52) U.S. Cl.
CPC ........... *G02B 6/3628* (2013.01); *G02B 6/262* (2013.01); *G02B 6/424* (2013.01)

(58) Field of Classification Search
CPC ...... G02B 6/262; G02B 6/3628; G02B 6/424; G02B 6/4267
See application file for complete search history.

(56) References Cited

U.S. PATENT DOCUMENTS

| | | | | |
|---|---|---|---|---|
| 7,284,911 B2 * | 10/2007 | Takeda | ..................... | G02B 6/30 385/71 |
| 2003/0077054 A1 | 4/2003 | Marazzi et al. | | |
| 2006/0088249 A1 | 4/2006 | Takeda | | |
| 2008/0239468 A1 | 10/2008 | Hamada | | |

FOREIGN PATENT DOCUMENTS

| | | |
|---|---|---|
| JP | H0815573 A | 1/1996 |
| JP | 2006-010891 A | 1/2006 |
| JP | 2008-244223 A | 10/2008 |
| JP | 2012-53217 A | 3/2012 |

OTHER PUBLICATIONS

H. Tanobe, Y. Kurata, Y. Nakanishi, H. Fukuyama, M. Itoh, and E. Yoshida, Compact 100Gb/s DPQPSK Integrated Receiver Module Employing Three-Dimensional Assembly Technology, Optics Express 22(5), (2014) pp. 6108-6113.

* cited by examiner

*Primary Examiner* — Michael P Mooney
(74) *Attorney, Agent, or Firm* — Workman Nydegger

(57) ABSTRACT

An optical module according to the present invention includes: an optical device including an optical waveguide chip; an optical fiber block bonded to and arranged on an end face of the optical waveguide chip; an optical fiber that has one end optically connected to the optical waveguide chip via the optical fiber block; an optical fiber holding mechanism for holding the other end of the optical fiber; and an optical fiber carrier. The optical fiber is arranged while being curved from the optical fiber carrier toward the optical fiber block in a U-shape, and a wall structure is formed on the surface of the carrier while being adjacent to the optical fiber at, for example, a position on the outer side of the U-shaped curve of the optical fiber position at which the wall structure reduces a normal force of the optical fiber.

4 Claims, 8 Drawing Sheets

Fig. 2
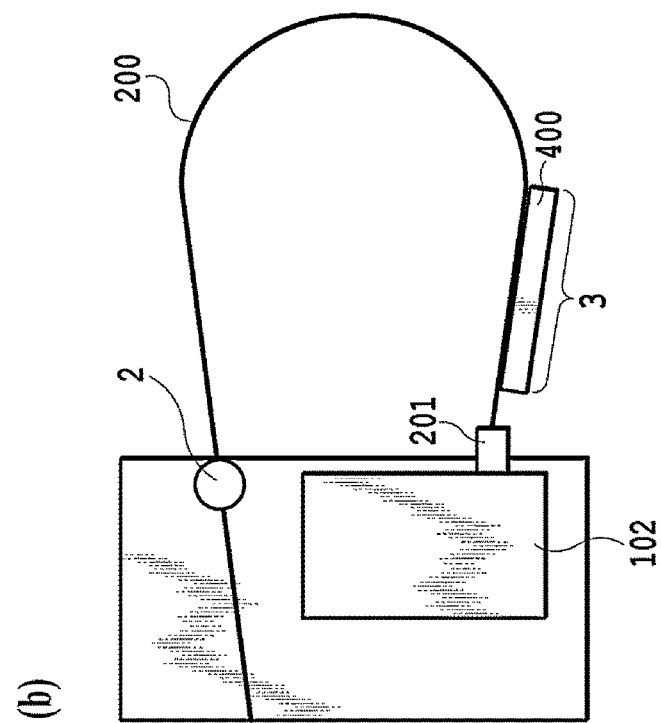
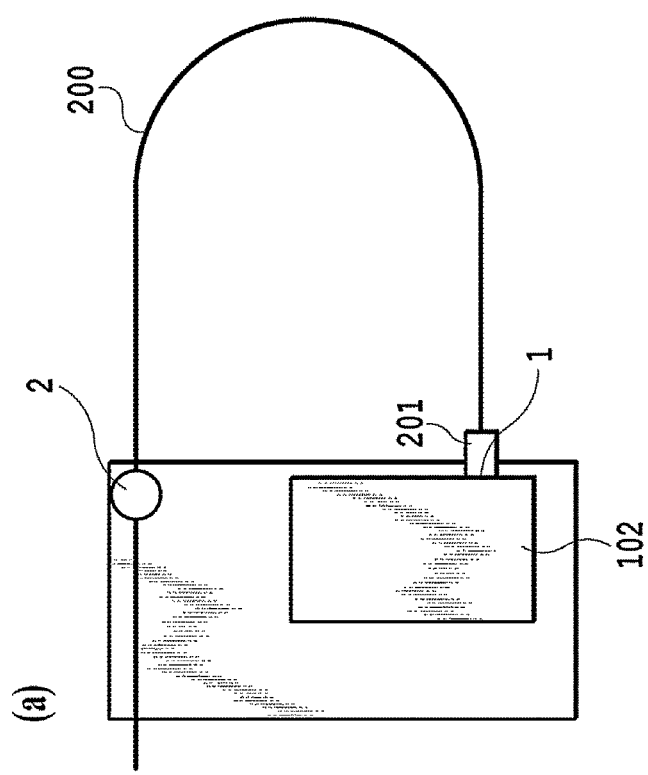

OPTICAL MODULE

TECHNICAL FIELD

The present disclosure relates to an optical communication component for transmitting and processing a high-frequency electric signal and an optical signal, and more specifically to an optical module that has a structure for reducing a stress that acts on an optical connection portion between an optical fiber to which an optical fiber block is attached and an optical waveguide chip.

BACKGROUND ART

In the context of a rapid increase in communication demands, extensive studies on large-capacity communication networks are being carried on. Also, there is a strong demand for optical modules that realize high integration of functions and are downsized with the aim of increasing a bit rate per unit volume of communication equipment. Ball Grid Array (BGA), which can realize a large number of high-density electrical interfaces, is a key technology for downsizing an optical module (NPL 1). Also, a BGA package is mounted on a substrate by reflow mounting, and thus a reduction in the mounting cost is expected compared to a case where a pin package with pins protruding from sides and an FPC package are mounted by soldering, the pin package and the FPC package being used in conventional optical modules.

CITATION LIST

Patent Literature

[PTL 1] Japanese Patent Application Publication No. 2008-244223
[PTL 2] Japanese Patent Application Publication No. 2012-53217

Non Patent Literature

[NPL 1] H. Tanobe, Y. Kurata, Y. Nakanishi, H. Fukuyama, M. Itoh, and E. Yoshida, "Compact 100 Gb/s DP-QPSK integrated receiver module employing three-dimensional assembly technology", OPTICS EXPRESS 22(5), (2014) pp. 6108-6113

SUMMARY OF THE INVENTION

Technical Problem

FIGS. 1(a) and 1(b) show a conventional optical fiber-attached optical device in a top view, and a cross-sectional view taken along a line IB-IB' in FIG. 1(a), respectively. In contrast to an electronic device, an optical device 100 typically includes an optical waveguide chip 102 and an IC chip 103 that are mounted on a substrate 105, and an optical fiber block 201 that optically couples an optical fiber 200 for inputting and outputting an optical signal with the optical waveguide chip 102. Note that there may be a case where Ball Grid Array electrodes 101 are provided on the underside of the substrate 105. Also, in the optical device 100, a lid 104 may be provided over the optical waveguide chip 102 and the IC chip 103.

When the optical device 100 is heated, the shape thereof changes, and thus if the optical device 100 to which the optical fiber 200 is connected is subjected to a reflow process, there is a risk that the optical fiber 200 may largely move in a furnace.

Accordingly, as in PTL 1, a configuration is easily conceivable in which the optical fiber 200 is held in a state of being wound in a reel on an optical module. At this time, if it is desired to hold the optical fiber in a small region in order to minimize the influence of the optical fiber on another component, the optical fiber will need to be curved so as to create a space having a small radius of curvature (for example, 5 mm). However, as shown in FIG. 2(a), a restoring force caused by the optical fiber 200 being curved, as described in PTL 2, is applied to an optical connection portion (corresponding to an action point 1) between the optical fiber 200 and the optical waveguide chip 102. If this stress acts on the optical connection portion between the optical waveguide chip 102 and the optical fiber 200, an adhesive that fixes this optical connection portion will deform and move the positional relationship of the optical connection point, and a problem may occur in which an optical connection loss increases. Note that a portion of an optical fiber holding mechanism that holds another end of the optical module and against which the optical fiber 200 is pressed corresponds to an action point 2.

The invention according to embodiments of the present invention was made in view of the aforementioned problem, and an object thereof is to provide an optical module that can reduce a restoring force that is caused by a deformation of an optical fiber and is applied to an optical connection point between an optical waveguide chip and the optical fiber, and can suppress an optical loss at this connection point.

Means for Solving the Problem

In order to solve the above-described problem, the invention according to embodiments of the present invention is characterized by including the following configurations.

In order to solve the above-described problem, according to one aspect of an optical module according to embodiments of the present invention, the optical module includes: an optical fiber block; an optical fiber to which the optical fiber block is attached, and includes a curved portion; an optical waveguide chip optically connected to the optical fiber; and a wall structure provided in the vicinity of the optical fiber, wherein the wall structure is arranged at a position at which, when the optical fiber comes into contact with the wall structure, the wall structure reduces a restoring force of the optical fiber that is applied to an optical connection portion between the optical waveguide chip and the optical fiber block, due to a resistance that acts on the optical fiber from the wall structure. Also, the wall structure is arranged at a position at which the optical fiber block comes into contact with the wall structure, the position being located in a portion of the curved portion of the optical fiber that is the closest to the optical fiber block, or a portion of the optical fiber between the curved portion and the optical fiber block.

Effects of the Invention

With the use of the invention according to embodiments of the present invention, when an optical fiber is curved, a portion of the optical fiber comes into contact with the wall structure, and thereby it is possible to reduce a restoring force that is caused due to the deformation of the optical fiber and acts on an optical connection point between the optical waveguide chip and the optical fiber, making it possible to suppress an increase in the optical loss at this connection point.

BRIEF DESCRIPTION OF DRAWINGS

FIG. 2(a) is a diagram illustrating the principle of the present invention. FIG. 2(b) is a diagram illustrating the principle of the present invention.

DESCRIPTION OF EMBODIMENTS

Figure 1:
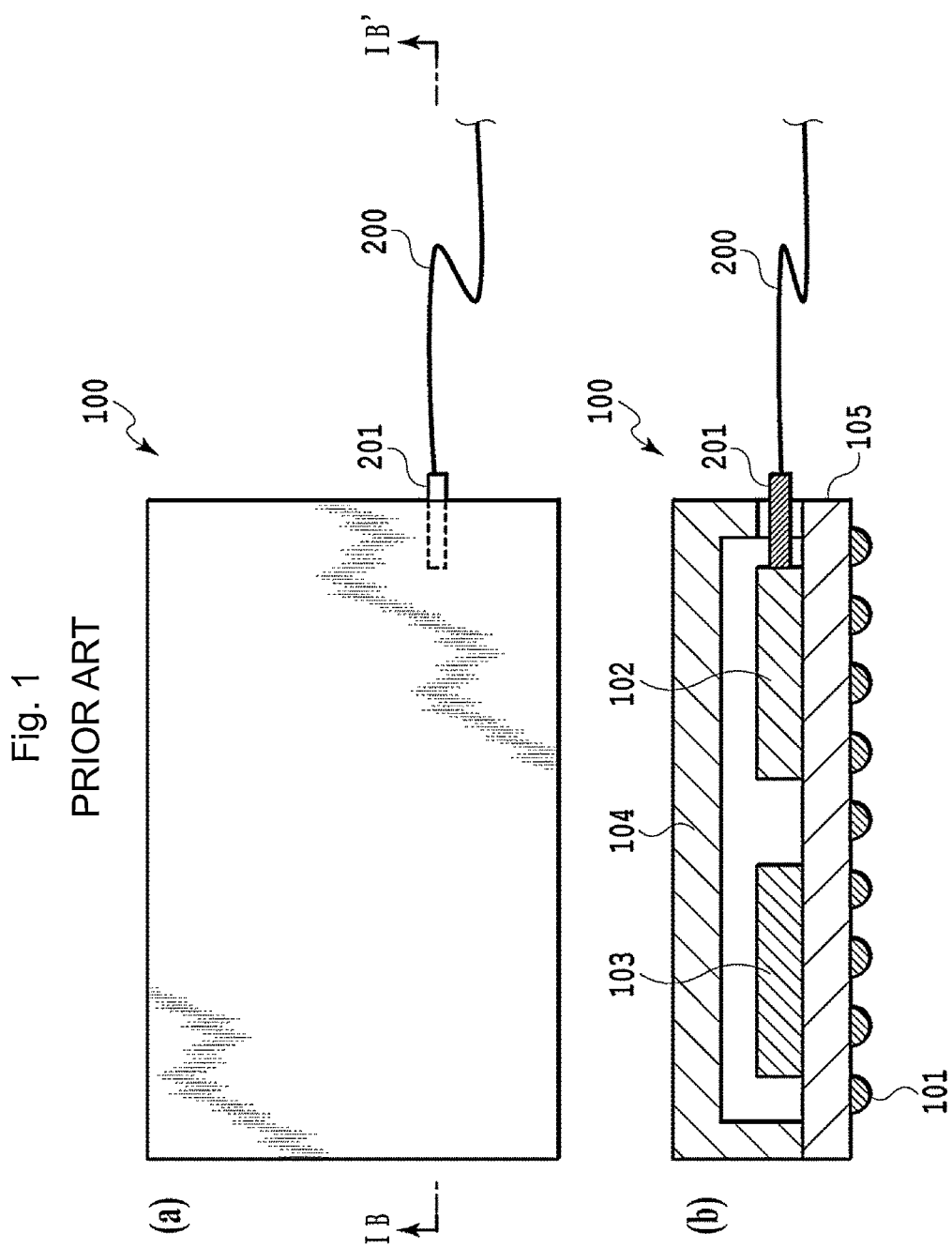
FIG. 1(a) is a top view illustrating a conventional optical fiber-attached optical device.
FIG. 1(b) is a cross-sectional view of the conventional optical fiber-attached optical device.

Hereinafter, embodiments of the present invention will be described with reference to the drawings. Note that in the drawings, the same reference numerals are given to portions having the same function, in order to make the description clear. Note however that the present invention is not limited to the below-described description of the embodiments, and it is obvious for a person skilled in the art that various modifications of the configurations and details are possible without departing from the spirit of the invention disclosed in the present specification and the like. Also, the configurations of different embodiments can be implemented in appropriate combination with each other.

Embodiment 1

Figure 4:
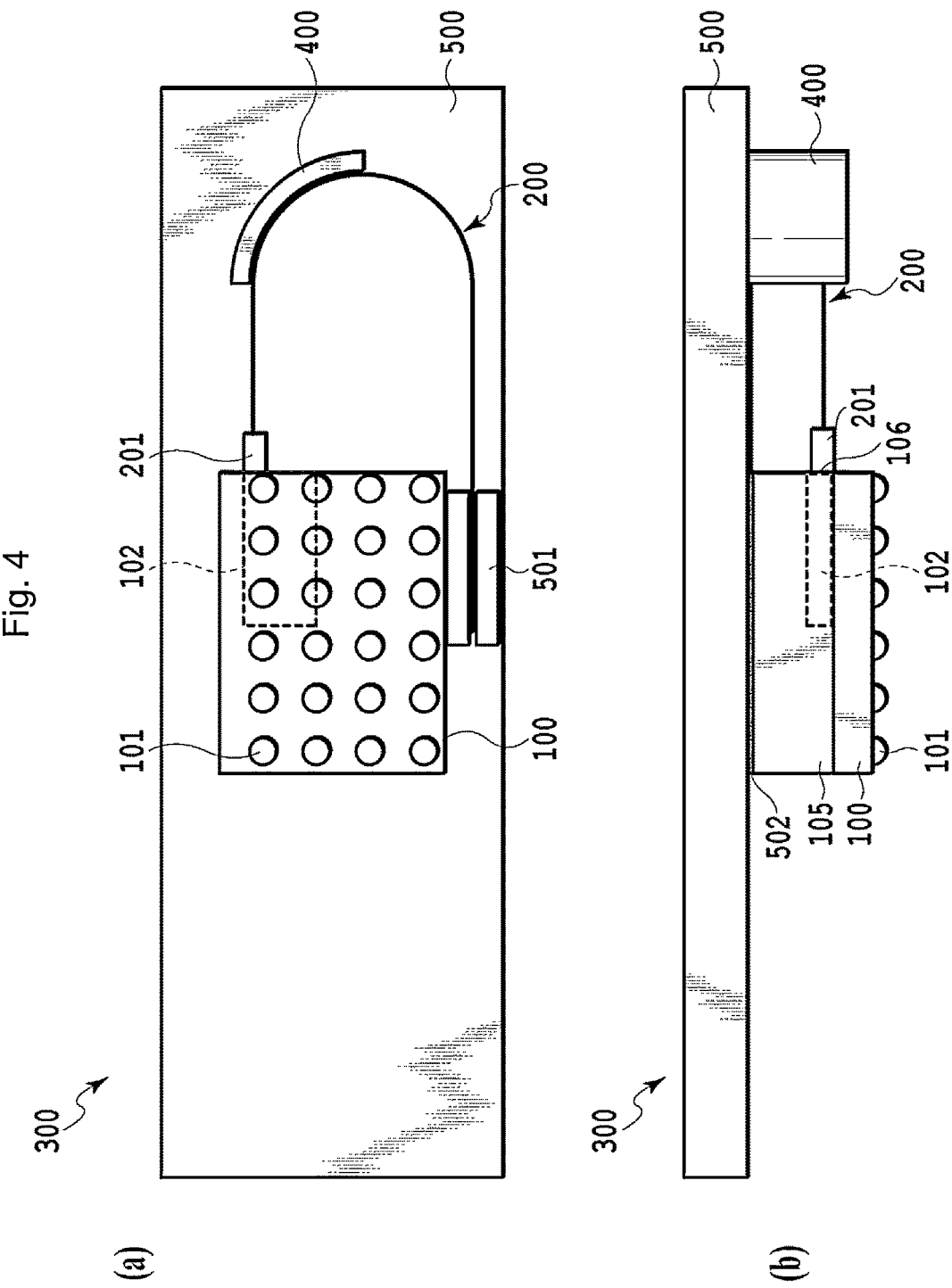
FIG. 4(a) is a bottom view illustrating an optical module according to a first embodiment of the present invention.
FIG. 4(b) is a side view illustrating the optical module according to the first embodiment of the present invention.

FIGS. 4(a) and 4(b) respectively show, in a bottom view and a side view, a configuration of an optical module according to a first embodiment of the present invention. An optical module 300 according to the first embodiment of the present invention is an optical module provided with: an optical device 100 including an optical waveguide chip 102; an optical fiber block 201 bonded to and arranged on an end face of the optical waveguide chip 102; an optical fiber 200 that has one end optically connected to the optical waveguide chip via the optical fiber block 201; an optical fiber holding mechanism 501 that holds the other end of the optical fiber 200; and a carrier 500 that has a surface to which the optical device 100 and the optical fiber holding mechanism 501 are fixed. Also, in the optical module 300, the optical fiber 200 is arranged while being curved in a U-shape from the optical fiber holding mechanism 501 toward the optical fiber block 201, and a wall structure 400 is formed on the surface of the carrier while being adjacent to the optical fiber 200 at a position at which the wall structure 400 reduces a restoring force of the optical fiber, such as a position on the outer side of the U-shaped curve of the optical fiber 200.

As shown in FIGS. 4(a) and 4(b), the optical module 300 according to Embodiment 1 of the present invention includes the optical device 100, the optical fiber 200 to which the optical device 100 and the optical fiber block 201 are attached, the carrier 500 fixed to an upper portion of the optical device 100 with a reflowable adhesive layer 502, and the wall structure 400 arranged on the underside of the carrier 500.

The optical waveguide chip 102 included in the optical device 100 is fixed to an optical end face of the optical fiber block 201 with an adhesive, and is optically connected to the optical fiber 200 to which the optical fiber block 201 is attached. Note that the optical waveguide chip 102 may be a silicon photonics chip.

In the present embodiment, one optical fiber 200 is attached to the optical fiber block 201, but a configuration is also possible in which a plurality of optical fibers 200 are attached thereto, and are optically connected to the optical waveguide chip 102 at a plurality of points.

In the present embodiment, the wall structure 400 is made of the same material as that of the carrier 500. For example, the wall structure 400 can be produced by cutting aluminum, which is a lightweight metal, or can be made of a resin. A configuration is also possible in which the wall structure 400 is made of a material different from that of the carrier 500, and is fixed to the carrier 500 with a heat resistant adhesive or the like.

In the present embodiment, the carrier 500 and the optical device 100 are fixed to each other with the reflowable adhesive layer, but may also be fixed to each other by another method such as using an adhesive.

Figure 3:
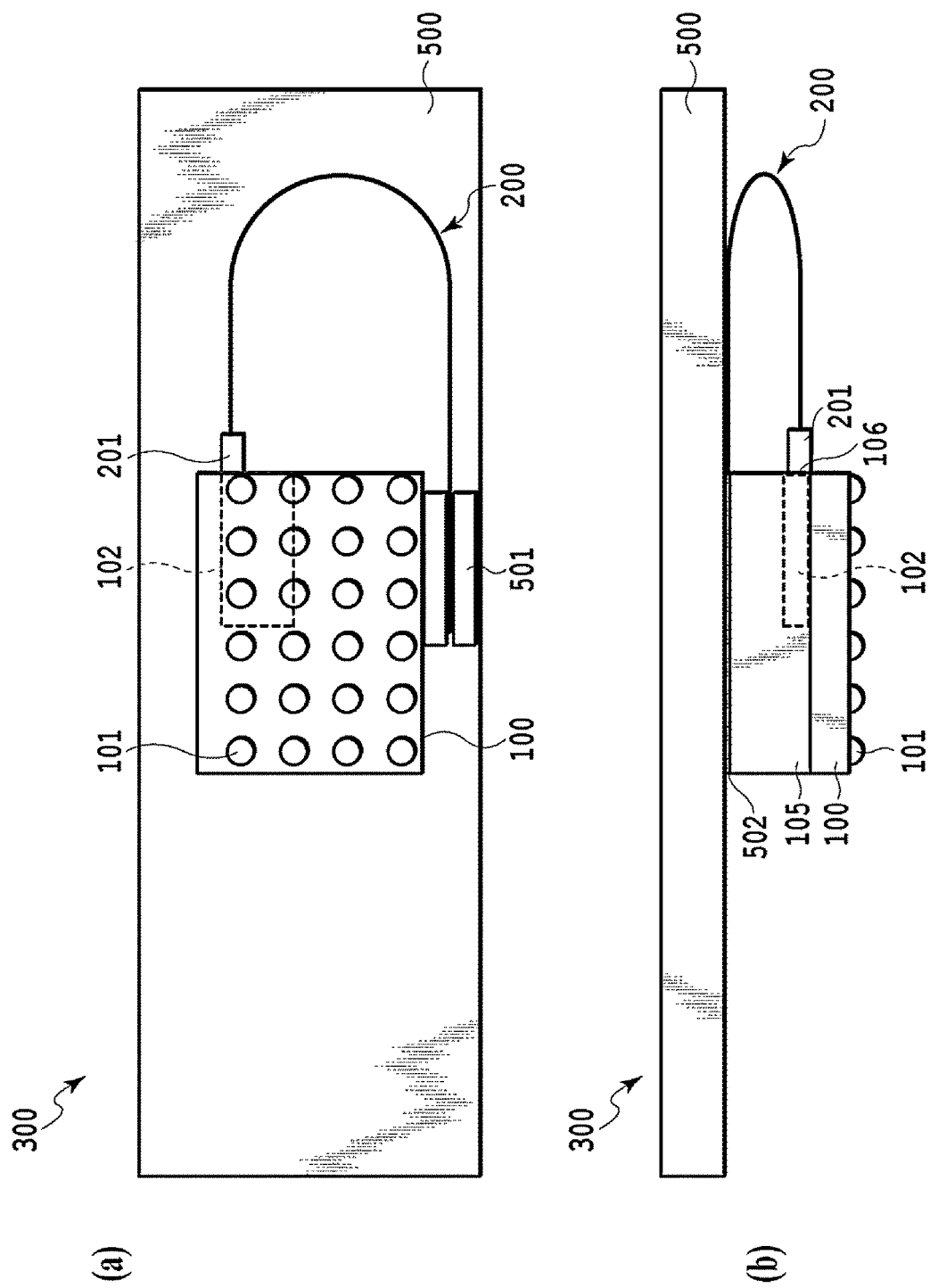
FIG. 3(a) is a bottom view illustrating a conventional optical module.
FIG. 3(b) is a side view illustrating the conventional optical module.

The optical fiber 200 has strong elasticity depending on the material or shape of a covering for protecting an optical fiber core. That is to say, if the optical fiber 200 is curved so as to form a space that has a small radius of curvature, e.g., about 5 mm, a restoring force will act to bring the optical fiber 200 to its linear shape. In a structure without the wall structure 400 as shown in FIG. 3, two portions, namely, a portion at which the optical fiber 200 is pressed against the optical fiber holding mechanism 501 (action point 2), and a connection surface 106 (action point 1) between the optical fiber block 201 and the optical waveguide chip 102, constrain the deformation of the optical fiber, and the restoring force is applied to this two portions. This restoring force is increased the greater the deformation is, and the restoring force is increased the smaller the region in which the optical fiber is held is.

At the connection surface 106, the optical fiber block 201 and the optical waveguide chip 102 are fixed to each other with an adhesive. Accordingly, the restoring force may deform the adhesive, and may displace the optical connection position, increasing an optical loss in the optical connection portion.

As shown in FIG. 2(b), in the optical module of the present embodiment, a restoring force caused by a deformation is balanced with a resistance occurring at a portion at which the wall structure 400 and the optical fiber 200 are in contact with each other. Accordingly, it is possible to reduce the restoring force that acts on the connection surface 106 between the optical waveguide chip 102 and the optical fiber block 201, and prevent an increase in the optical loss in the optical connection portion between the optical waveguide chip 102 and the optical fiber block 201, the optical loss being caused due to a displacement of the optical connection position.

Using the invention according to the embodiment of the present invention, when the optical fiber is curved as shown in FIG. 2(b), a portion of the optical fiber comes into contact with the wall structure 400 (action point portion 3), and thereby it is possible to reduce the restoring force that is caused due to the deformation of the optical fiber 200 and acts on the optical connection point between the optical waveguide chip 102 and the optical fiber 200, making it possible to suppress an increase in the optical loss at this connection point. Note that the wall structure 400 is arranged in a portion of the curved portion of the optical fiber 200 that is the closest to the optical fiber block 201. If it is assumed that the region of the optical fiber 200 is divided into two portions at the farthermost position from the optical device 100, the wall structure 400 is typically formed in the portion in which the optical fiber block 201 is provided.

Also, in the optical module of the present embodiment, the wall structure 400 and the optical fiber 200 are not fixed to each other with an adhesive, a tape, or the like, and the optical fiber 200 is only physically in contact with the wall structure 400. It is assumed that the optical module of the present embodiment includes BGA (Ball Grid Array) electrodes 101, and is mounted on another electronic substrate by a high-temperature process such as reflow mounting. Accordingly, if the wall structure 400 and the optical fiber 200 are fixed to each other with an adhesive for example, there is a risk that a tensile stress or a pressure stress may act on the optical connection portion during the mounting process in which the optical module 300 is subjected to a high temperature unless the coefficients of thermal expansion of the carrier 500 including the wall structure 400, and the optical fiber 200 match each other, and an optical loss in this optical connection portion may increase. Therefore, the degree of freedom in selecting the material of the carrier may be reduced, and it is impossible to select an inexpensive material. Accordingly, in the optical module of the present embodiment, an example has been described in which the wall structure and the optical fiber are not fixed with an adhesive.

Embodiment 2

Figure 5:
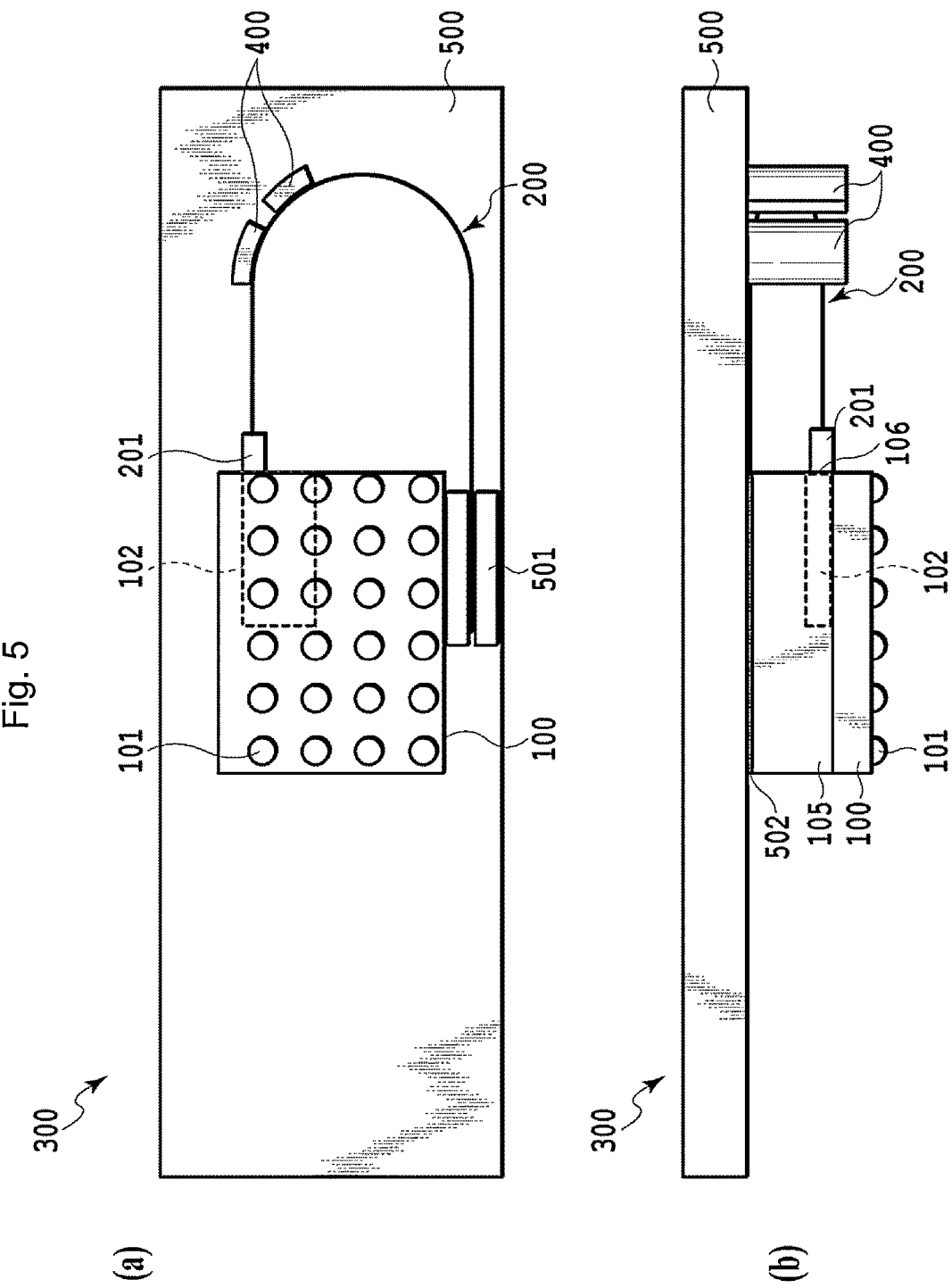
FIG. 5(a) is a bottom view illustrating an optical module according to a second embodiment of the present invention.
FIG. 5(b) is a side view illustrating the optical module according to the second embodiment of the present invention.

FIGS. 5(a) and 5(b) respectively show, in a bottom view and a side view, a configuration of the optical module according to a second embodiment of the present invention. As shown in FIGS. 5(a) and 5(b), the optical module 300 according to Embodiment 2 of the present invention is such that the wall structure 400 of the configuration shown in Embodiment 1 is divided into parts located at a plurality of positions, for example, two positions. In this way, even if the wall structure 400 is divided into a plurality of parts, there is the effect of reducing the restoring force that acts on the connection surface 106.

Embodiment 3

FIGS. 6(a) and 6(b) respectively show, in a bottom view and a side view, a configuration of the optical module according to a third embodiment of the present invention.

Figure 6:
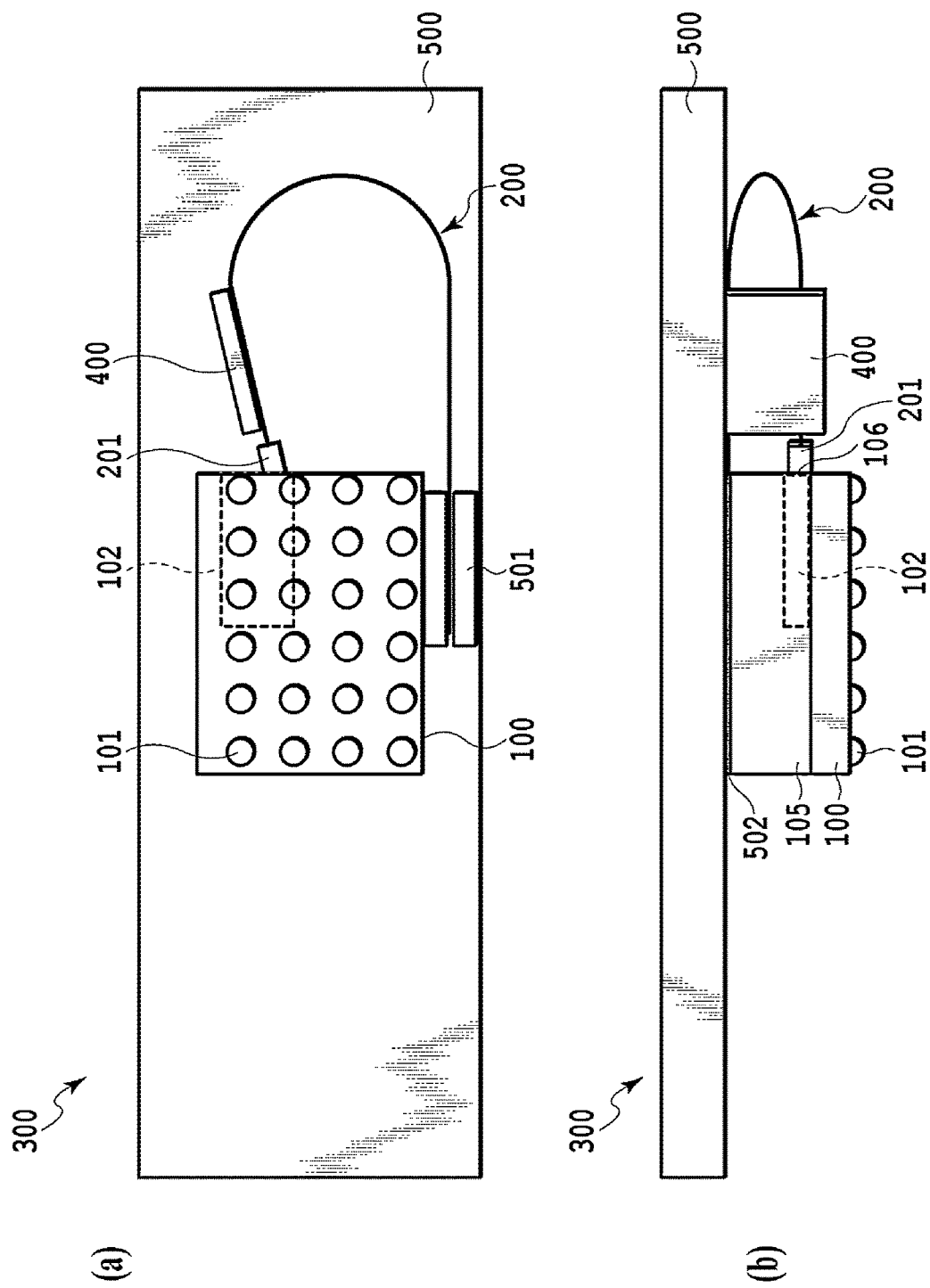
FIG. 6(a) is a bottom view illustrating an optical module according to a third embodiment of the present invention.
FIG. 6(b) is a side view illustrating the optical module according to the third embodiment of the present invention.

As shown in FIGS. 6(a) and 6(b), the optical module 300 according to Embodiment 3 of the present invention differs from the configuration of the optical module 300 shown in Embodiment 1 in the layout of the wall structure 400. The wall structure 400 is arranged at a position at which the optical fiber block 201 comes into contact with the wall structure 400, the position being located in a portion of the optical fiber 200 between the portion of the curved portion of the optical fiber 200 that is closest to the optical fiber block 201, and the optical fiber block 201. When the wall structure 400 is arranged in the portion (on the linear portion of the optical fiber) shown in FIG. 6, the optical fiber 200 is pressed against the wall structure 400 due to a restoring force acting to bring the optical fiber 200 in its linear shape. In the portion in which the wall structure 400 and the optical fiber 200 are in contact with each other, the optical fiber is subjected to a resistance from the wall structure 400, and thus the wall structure 400 of Embodiment 3 has the effect of reducing the restoring force that acts on the connection surface between the optical fiber block 201 and the optical waveguide chip 102.

Embodiment 4

Figure 7:
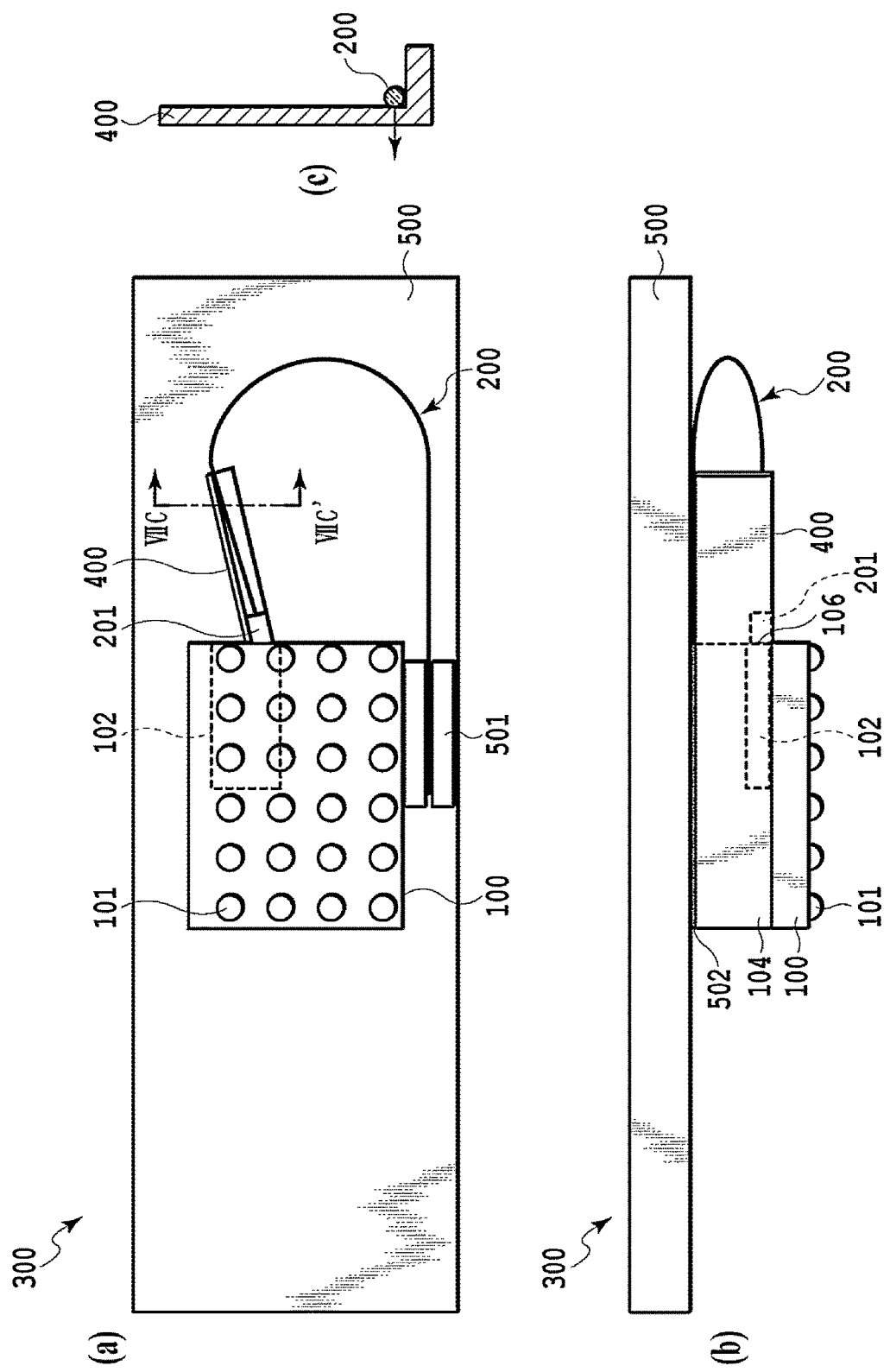
FIG. 7(a) is a bottom view illustrating an optical module according to a fourth embodiment of the present invention.
FIG. 7(b) is a side view illustrating the optical module according to the fourth embodiment of the present invention.

FIGS. 7(a) and 7(b) respectively show, in a bottom view and a side view, a configuration of the optical module according to a fourth embodiment of the present invention.

As shown in FIGS. 7(a) and 7(b), the optical module 300 according to Embodiment 4 of the present invention is such that the wall structure 400 of the configuration shown in Embodiment 3 is arranged on the lid 104. As shown in a cross-sectional view taken along a line $V_{IIC}$-$V_{IIC'}$, the optical fiber 200 is pressed against the wall structure 400 arranged on the lid 104 due to a restoring force. In the portion in which the wall structure 400 and the optical fiber 200 are in contact with each other, the optical fiber is subjected to a resistance from the wall structure 400, and thus the optical module using the wall structure 400 has the effect of reducing the restoring force that acts on the connection surface between the optical fiber block 201 and the optical waveguide chip 102.

Embodiment 5

Figure 8:
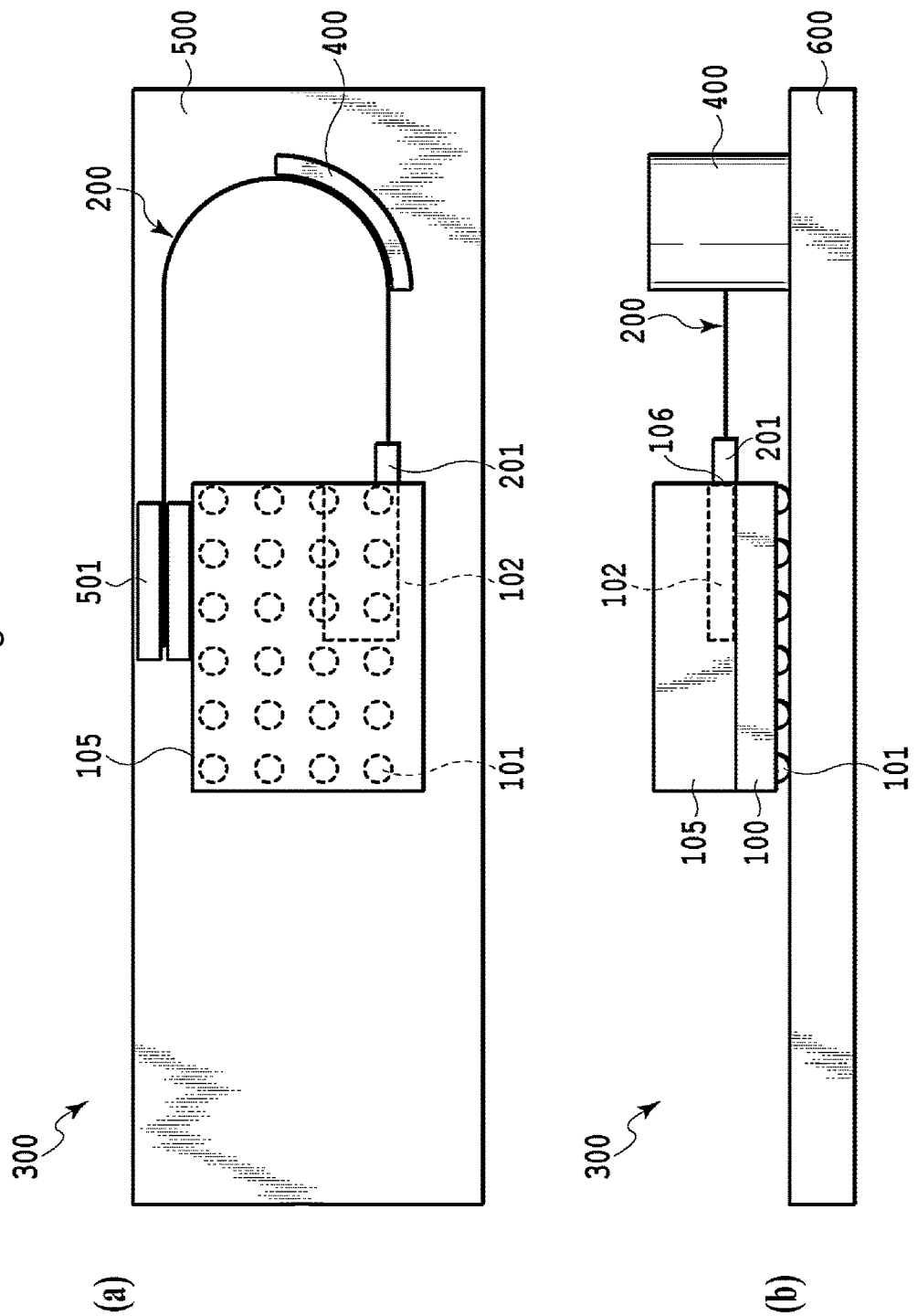
FIG. 8(a) is a top view illustrating an optical module according to a fifth embodiment of the present invention.
FIG. 8(b) is a side view illustrating the optical module according to the fifth embodiment of the present invention.

FIGS. 8(a) and 8(b) respectively show, in a bottom view and a side view, a configuration of the optical module 300 according to a fifth embodiment of the present invention.

As shown in FIGS. 8(a) and 8(b), the optical module 300 according to Embodiment 5 of the present invention is such that the wall structure 400 of the configuration shown in Embodiment 1 is arranged on an electronic substrate 600 on which the optical device 100 is mounted. The optical fiber 200 is pressed against the wall structure 400 arranged on the electronic substrate 600 due to a restoring force. In the portion in which the wall structure 400 and the optical fiber 200 are in contact with each other, the optical fiber is subjected to a resistance from the wall structure 400, and thus the wall structure 400 has the effect of reducing the restoring force that acts on the connection surface between the optical fiber block and the optical waveguide chip. The wall structure 400 of the present embodiment may be a wall structure that can be removed after the optical module 300 has been mounted by reflow mounting.

Although in the present embodiment, the wall structure is formed on the electronic substrate, the wall structure 400 may also be formed on the substrate 105 on which an optical waveguide chip is mounted by the same method.

The invention claimed is:

1. An optical module comprising:
   an optical fiber block;
   an optical fiber to which the optical fiber block is attached, the optical fiber having a curved portion;
   an optical waveguide chip optically connected to the optical fiber; and
   a wall structure provided in a vicinity of the optical fiber,
   wherein the wall structure is arranged at a location at which, when the optical fiber comes into contact with the wall structure, the wall structure reduces a restoring force of the optical fiber that is applied to an optical connection portion between the optical waveguide chip and the optical fiber block, by a resistance that acts on the optical fiber from the wall structure, and
   wherein a cross section of the wall structure is L-shaped and the optical fiber is in contact with two portions that form the cross section being L-shaped.

2. The optical module according to claim 1, wherein the wall structure is formed on a carrier for holding the optical fiber, the carrier being arranged above the optical waveguide chip.

3. The optical module according to claim 1, wherein the wall structure is formed on an electronic substrate on which the optical waveguide chip is mounted.

4. The optical module according to claim 2, wherein the wall structure is formed on an electronic substrate on which the optical waveguide chip is mounted.

* * * * *